US008808088B1

(12) United States Patent
Brunell et al.

(10) Patent No.: US 8,808,088 B1
(45) Date of Patent: Aug. 19, 2014

(54) COORDINATING MEDIA CONTENT IN WAGERING GAME SYSTEMS

(75) Inventors: Edward G. Brunell, Chicago, IL (US); Paul J. Radek, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 323 days.

(21) Appl. No.: 13/276,816

(22) Filed: Oct. 19, 2011

Related U.S. Application Data

(60) Provisional application No. 61/405,496, filed on Oct. 21, 2010.

(51) Int. Cl.
*G07F 17/32* (2006.01)
*A63F 9/24* (2006.01)
*G06F 13/00* (2006.01)

(52) U.S. Cl.
CPC . *G07F 17/32* (2013.01); *A63F 9/24* (2013.01); *G06F 13/00* (2013.01)
USPC ............................................. 463/31; 463/20

(58) Field of Classification Search
CPC ........... G07F 17/32; A63F 9/24; G06F 13/00; G06F 15/16
USPC ......................................... 463/20, 30, 31, 42
See application file for complete search history.

(56) References Cited

U.S. PATENT DOCUMENTS

| 8,052,515 | B2* | 11/2011 | Nakamura | 463/20 |
| 2003/0109304 | A1* | 6/2003 | Gauselmann | 463/30 |
| 2004/0166932 | A1* | 8/2004 | Lam et al. | 463/30 |
| 2007/0218974 | A1* | 9/2007 | Patel et al. | 463/20 |
| 2008/0009347 | A1* | 1/2008 | Radek | 463/35 |
| 2011/0154197 | A1* | 6/2011 | Hawthorne et al. | 715/704 |

* cited by examiner

*Primary Examiner* — William Brewster
*Assistant Examiner* — Jason Skaarup
(74) *Attorney, Agent, or Firm* — DeLizio Gilliam, PLLC

(57) ABSTRACT

In some embodiments, a method includes receiving, at a first media controller in the wagering game system, a playlist identifier that identifies a playlist, wherein the playlist is associated with scripts that, when executed, present media effects of the coordinated media show. The method can also include presenting, by the first media controller, a first of the media effects by executing a first of the scripts associated with the playlist, and detecting an indication to wait for a synchronization marker from a second media controller. The method can also include receiving, over a multi-drop network, the synchronization marker from the second media controller, and selecting a second of the scripts associated with the playlist, after receiving the synchronization marker. The method can also include presenting, by the first media controller, a second of the media effects by executing the second of the scripts.

20 Claims, 12 Drawing Sheets

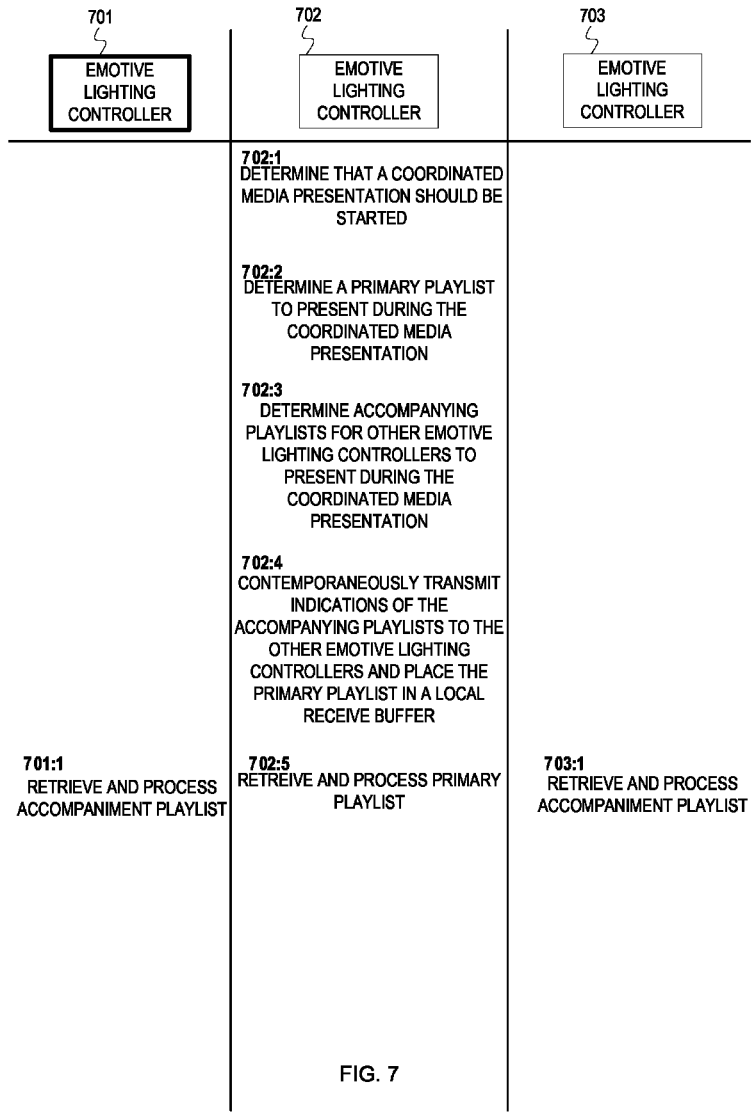

| 701 | 702 | 703 |
|---|---|---|
| EMOTIVE LIGHTING CONTROLLER | EMOTIVE LIGHTING CONTROLLER | EMOTIVE LIGHTING CONTROLLER |
| 701:2 DETERMINE THAT A SYNCHRONIZATION MARKER SHOULD BE RECEIVED BEFORE TRANSITIONING FROM A FIRST SCRIPT TO A SECOND SCRIPT IN THE ACCOMPANYING PLAYLIST | 702:6 DETERMINE THAT A SYNCHRONIZATION TRIGGER SHOULD BE DETECTED | 703:2 DETERMINE THAT A SYNCHRONIZATION MARKER SHOULD BE RECEIVED BEFORE TRANSITIONING FROM A FIRST SCRIPT TO A SECOND SCRIPT IN THE ACCOMPANYING PLAYLIST |
| | 702:7 DETECT THE SYNCHRONIZATION TRIGGER | |
| | 702:8 TRANSMIT SYNCHRONIZATION MARKERS | |
| 701:3 RECEIVE SYNCHRONIZATION MARKER | 702:9 RECEIVE SYNCHRONIZATION MARKER | 703:3 RECEIVE SYNCHRONIZATION MARKER |
| 701:4 TRANSITION TO THE SECOND SCRIPT IN THE ACCOMPANYING PLAYLIST | 702:10 TRANSITION TO THE SECOND SCRIPT IN THE PRIMARY PLAYLIST | 703:4 TRANSITION TO THE SECOND SCRIPT IN THE ACCOMPANYING PLAYLIST |

COORDINATING MEDIA CONTENT IN WAGERING GAME SYSTEMS

RELATED APPLICATIONS

This application claims the priority benefit of U.S. Provisional Application Ser. No. 61/405,496 filed Oct. 21, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems capable of controlling and presenting lighting content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

Some wagering game systems enhance player experiences by using lighting effects, such as colored lighting, strobe lighting, spot lighting, etc. Such systems may present various lighting effects in response to large jackpot wins, game events (e.g., a particular slot reel combination), and other events in the systems. As wagering game systems grow larger and more sophisticated, so grows the need for better techniques for controlling and presenting lighting content.

BRIEF DESCRIPTION OF THE FIGURES

Embodiments of the invention are illustrated in the Figures of the accompanying drawings in which:

FIGS. 7 and 8 are conceptual diagrams depicting operations for presenting coordinated media shows, according to some embodiments of the invention.

DESCRIPTION OF THE EMBODIMENTS

The following sections describe embodiments of the inventive subject matter.

Introduction

Wagering game systems typically include wagering game machines, overhead signs, audio speakers, display devices, lighting devices (e.g., spot lights, light bars, etc.), and more. In addition to conducting wagering games, such systems often present entertaining media content, such as music, motion picture video, animation, and more. In some instances, these systems also use lighting effects to enhance player experiences. For example, some systems use lighting effects to: induce excitement when players win jackpots, draw players to certain areas of a casino, create ambiance, etc.

Figure 1:
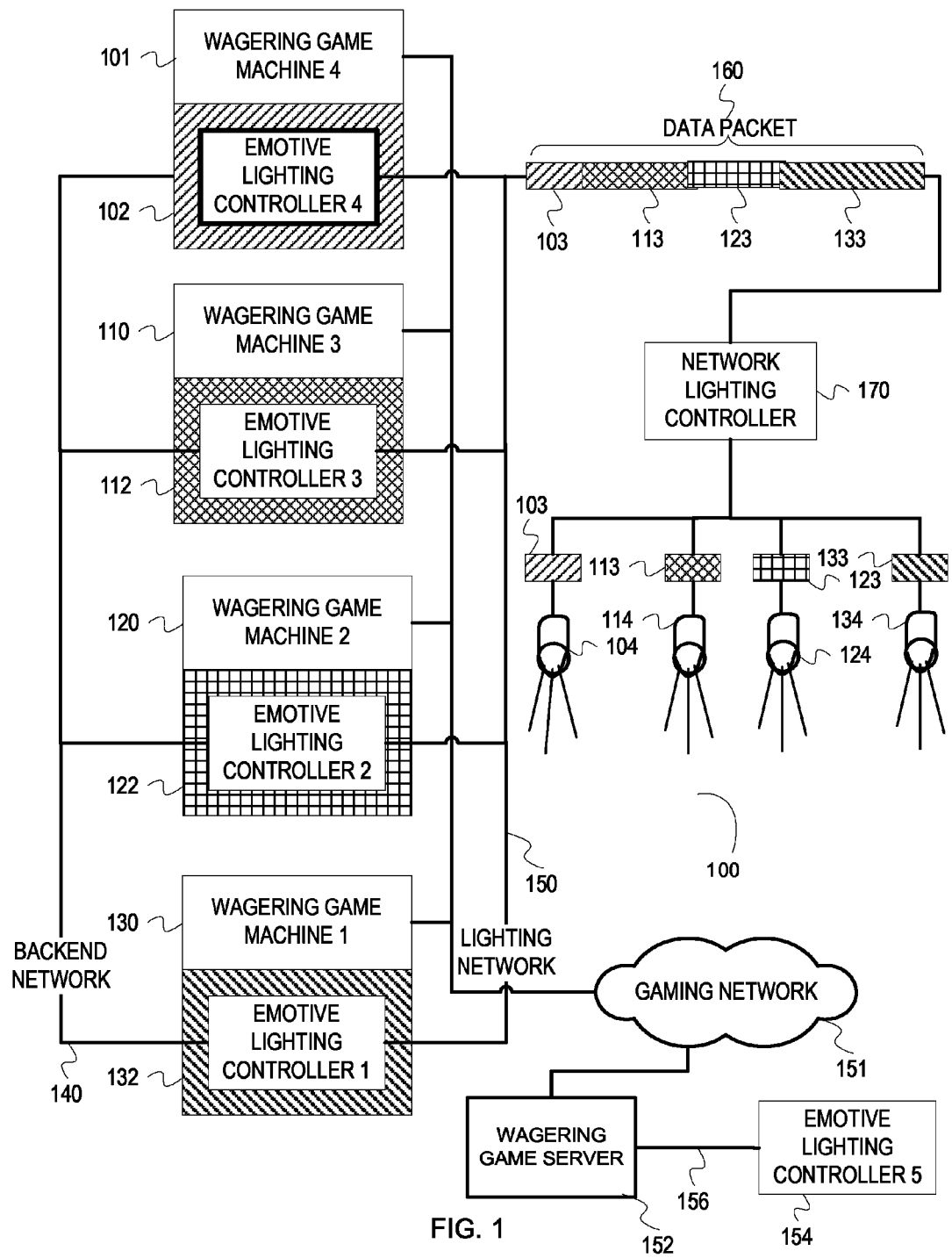
FIG. 1 shows a wagering game system capable of presenting lighting effects, according to some embodiments of the invention.

Embodiments of the inventive subject matter include specialized components for presenting emotive lighting and other lighting effects. FIG. 1 shows a wagering game system capable of presenting lighting effects, according to some embodiments of the invention. In FIG. 1, a wagering game system 100 includes wagering game machines 101, 110, 120, & 130, emotive lighting controllers (also referred to as "lighting controllers" and "media controllers") 102, 112, 122, & 132, a network lighting controller 170, a dedicated lighting network 150, and a backend network 140. The system 100 also includes lighting devices (e.g., spot lights) 104, 114, 124, & 134. The emotive lighting controllers initiate lighting effects (e.g., in response to the game events), while other components facilitate presentation of the lighting effects.

In some embodiments, one of the emotive lighting controllers (ELCs) acts as a "host" (e.g., ELC 102). In a process for presenting lighting effects, the non-host ELCs transmit lighting commands to the host ELC. In turn, the host ELC translates the lighting commands into lighting device instructions, and transmits the instructions to the lighting devices for execution.

To provide fault recovery, the ELCs can maintain state information that may be useful if the host ELC is unavailable. In some embodiments, all non-host ELCs "listen for" and record all lighting commands sent to the host ELC. All non-host ELCs also "listen for" and record all lighting device instructions transmitted for execution on the lighting devices. As a result, the non-host ELCs maintain state information that may be useful if the host ELC becomes unavailable. If the host becomes unavailable, a new host is selected from the non-hosts. The new host can use its state information to continue processing lighting commands from where the old host left-off. Although some embodiments of the ELCs maintain state information, other embodiments do not.

While some embodiments provide fault recovery, other embodiments of the inventive subject matter present lighting effects that enhance player experiences. Some embodiments present multimedia shows that include lighting effects synchronized with media content, such as audio and/or video content. Yet other embodiments present distributed lighting shows that utilize remotely located lighting components. Such distributed lighting shows may present lighting effects near a bank of wagering game machines, in particular areas in a casino, and/or throughout an entire casino.

Although this introduction describes some embodiments of the inventive subject matter, other embodiments are described in more detail below.

Systems and Operations

This section further describes FIG. 1, presents FIGS. 2-8, and describes other embodiments of the inventive subject matter.

Example System Architecture

As noted above, the wagering game system 100 includes wagering game machines 101, 110, 120, & 130, emotive lighting controllers 102, 112, 122, & 132, a network lighting controller 170, a dedicated lighting network 150, and a backend network 140. The system 100 also includes a wagering game server 152, which is connected to another emotive lighting controller 154 via another lighting network 156. The wagering game machines 101, 110, 120, & 130 and wagering game server 152 are connected to a gaming network 151.

As shown, each wagering game machine is paired with an emotive lighting controller. Although not explicitly shown, there is a communication pathway between each wagering game machine and its associated emotive lighting controller. The emotive lighting controllers ("ELCs") 132, 222, 112, & 102 can be internal or external to their respective wagering game machines. The ELCs 132, 122, 112, & 102 can control local and remote lighting devices. That is, the ELCs can control lighting devices residing on or about the wagering game machines, and lighting devices located about a casino.

In FIG. 1, the ELCs are connected via two networks—the lighting network 150 and the backend network 140. In some embodiments, the lighting network 150 facilitates communications between the ELCs and the network lighting controller 170, whereas the backend network 140 facilitates communications among the ELCs. The backend network 140 can be a multi-drop network (i.e., a network capable of delivering data packets to all ELCs substantially simultaneously) used by the ELCs to present coordinated media shows, as described in more detail below (see discussion of FIGS. 5-8).

The lighting network 150 can utilize RS-485 cabling, and support the DMX512 protocol. The lighting network 150 can also utilize other cabling and support other protocols. In some embodiments, the lighting network 150 includes an RS-485 cable that connects the ELCs 132, 122, 112, & 102, and the network lighting controller 170. The ELCs and network lighting controller 170 can include RS-485 transceivers, which facilitate bi-directional communications across the lighting network 150. In some embodiments (e.g., embodiments that include RS-485 cabling), the lighting network 150 does not support multiple simultaneous transmissions between the ELCs and the network lighting controller 170. Thus, they wagering game server 152 (or another component) can appoint one of the ELCs as a host (e.g. ELC 102), where the host transmits lighting device instructions to the network lighting controller 170. However, before the host ELC transmits instructions to controller 170, the host ELC receives lighting commands from the other ELCs over the backend 140. The backend network 140 can include any suitable connection technology, such as Bluetooth, 802.11, Ethernet, RS-485, etc. The following discussion of FIG. 1 will provide more details about how the ELCs facilitate lighting effects.

In some instances, the ELCs include "playlists" corresponding to various events that occur in the system 100. The playlists can include scripts indicating lighting effects and other media content. For example, ELC 132 may have a playlist associated with a particular game's jackpot win event, where the playlist identifies a first script that calls for rotating the spotlight 134 in a circular motion, and a second script that calls for pointing the spotlight 134 at the wagering game machine 130. The ELC 132 can execute the scripts and generate lighting commands for rotating and pointing the spotlight 134, as defined in the scripts. In turn, the ELC 132 can transmit the lighting commands to the host ELC 102 via the backend network 140.

The host ELC 102 can receive the lighting commands over the backend network 140. After receiving commands, the host ELC 102 can use the commands to generate instructions for the network lighting controller 170. In some instances, the host ELC 102 generates the instructions by translating the commands (received from ELC 132) into a series of instructions understood by the network lighting controller 270. For the command indicating a rotation of the lighting device 134, the translation process may include determining a set of positions that represent one rotation. The host can generate one instruction for each position, and transmit the instructions to the network lighting controller 170 via the lighting network 150.

In some embodiments, the host ELC 102 generates the instructions based on the lighting network's frame rate. In generating the instructions (based on the commands), the host ELC 102 can determine a number of frames for completing a command. A light rotation command may indicate that the lighting device 134 should be rotated for 30 seconds. If the frame rate is 40 frames per second, and the ELC host 102 can transmit one instruction per frame, 1200 frames are needed to complete the rotation command. Also, for the rotation command, the host ELC 102 can determine a series of positions for the spotlight 134 based on a number of rotations indicated in the command and a rotation radius. The radius can be indicated explicitly in the command or otherwise available for determination. The host ELC 102 can determine the circumference based on the radius, and evenly divide the circumference into a number of positions based on the number of frames needed to complete the command. Then, the host 102 can generate a series of instructions indicating the positions, and transmit the instructions to the network lighting controller 170 at a rate of 40 instructions per second. As noted above, the host 102 transmits the instructions via the lighting network 150.

As activity on the wagering game system 100 increases, multiple ELCs may send lighting commands to the host ELC 102. The host ELC 202 can receive the commands over the backend network 140. In turn, the host can generate instructions for each of the commands, and aggregate the instructions into data packets. FIG. 1 depicts an example data packet 160. In some embodiments, the data packet 160 includes 512 bytes, and is formatted according to the DMX512 protocol. Segments of the data packet can be reserved for different ELCs. For example, the data packet's first 32 bytes may be reserved for instructions generated from commands from the ELC 132, the second 64 bytes may be reserved for ELC 122, etc. Thus, different data packet segments may be associated with different ELCs. As depicted in FIG. 1 (see hatching), ELC 102 is associated with packet segment 103, ELC 112 is associated with packet segment 113, ELC 122 is associated with packet segment 123, and ELC 132 is associated with packet segment 133. The packet segment sizes can differ, as needed. For example, ELCs may have larger segments in the data packet 160 if they control a large number lighting devices, or if they control lighting devices requiring a large number of parameters.

In FIG. 1, the lighting devices 134, 124, 114, & 104 are associated with the ELCs 132, 122, 112, & 102, respectively (see hatching). As noted, the ELCs 132, 122, 112, & 102 are assigned the data packet segments 133, 123, 113, & 103, respectively. The host 102 aggregates the instructions into the data packet 160 based on the segments associated with the ELCs. For example, instructions generated from commands of the ELC 122 are inserted into segment 123, whereas instructions generated from commands of the host ELC 102 are inserted into the segment 103. After inserting all the instructions into the data packet 160, the host ELC 202 transmits, via the lighting network 150, the data packet to the network lighting controller 170.

In response to receiving the data packet 160, the network lighting controller 170 configures the lighting devices 104, 114, 124, & 134 according to the instructions indicated in the data packet 160. As noted above, the instructions in segments 103, 113, 123, & 133 correspond to the lighting devices 104, 114, 124, & 134, respectively. Therefore, if instructions in the segment 103 indicate positions for the lighting devices 104, the network lighting controller 170 will move the lighting device 104 in accordance with the instructions. The controller 170 will also move the other lighting devices.

As noted above, the ELCs record state information, so they can continue presenting playlists if a host ELC becomes unavailable. As the host ELC 202 transmits data packets 160 to the network lighting controller 170, the host 102 can also transmit (via the lighting network 150) the data packets to the other ELCs for recordation. Similarly, all the ELCs can store their own commands, and they can transmit their commands to each other (via the backend network 140) for recordation. In some embodiments, to maintain a rich set of state information, the non-host ELCs 132, 122, & 112 generate instructions from the commands, and aggregate the instructions into packets (just like the host 102). Each of the non-host ELCs stores the packets as state information rather than transmitting them to the network lighting controller 170. To avoid storing redundant items, after ELCs receive packets from the host 102, they can delete their locally stored copies. If the non-host ELCs do not receive packets from the host 102 for a given time period, the non-host ELCs can assume the host 102 has failed, and notify the wagering game server 152 (or another component) that they are available to become the host. In response, the wagering game server 152 can select a new host. In some embodiments, the wagering game server 152 selects a new host randomly from those that indicated availability. Alternatively, the wagering game server 152 can select the new host based on which of the available ELCs has been most reliable. The new host ELC can continue transmitting instructions to the network lighting controller 170 where the previous host left-off.

Although FIG. 1 depicts a single network lighting controller 170, multiple network lighting controllers may be present in the dedicated lighting network 150. If there are multiple network lighting controllers, the host ELC 102 can transmit multiple packets per frame, where one packet is transmitted to each of the multiple network lighting controllers.

Building on the description of FIG. 1, this discussion continues with an example of how ELCs can initiate and control a light show. As described above, the ELCs can initiate the light show by generating and transmitting lighting commands and instructions. In the following example, the light show draws attention to a particular wagering game machine by shining ceiling-mounted spot lights and flashing adjacent light bars.

Example Light Show

Figure 2:
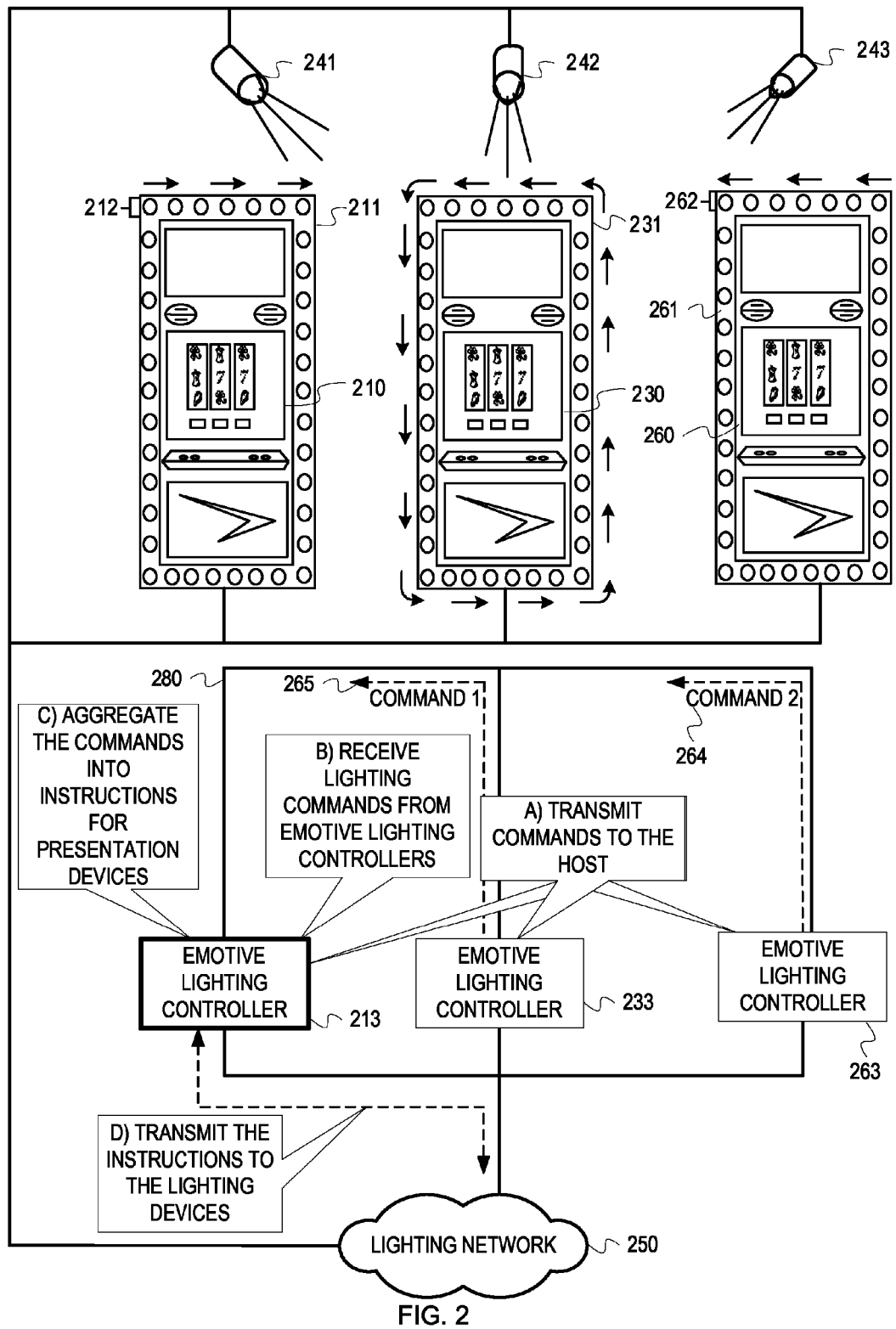
FIG. 2 is block diagram showing dataflow and operations for presenting lighting effects, according to some embodiments of the invention.

FIG. 2 is block diagram showing dataflow and operations for presenting lighting effects, according to some embodiments of the invention. FIG. 2 shows a wagering game system 200, which includes a bank of wagering game machines 210, 230, & 260. Each of the wagering game machines 210, 230, & 260 are associated with lighting devices. The lighting devices can include spotlights, LED arrays, wagering game machine cabinet lights, marquee lights, chair lighting, reel illuminator lights, etc. In the example shown in FIG. 2, the wagering game machine 210 is associated with a spotlight 241 and an LED array 211. The wagering game machine 230 is associated with a spotlight 242 and an LED array 231. The wagering game machine 260 is associated with a spotlight 243 and an LED array 261. As shown, the LED arrays 211, 231, & 261 are mounted on the wagering game machines' cabinets. In other embodiments, the ELCs can be associated with different lighting devices.

The system 200 also includes ELCs 213, 233, & 263. The ELC 213 controls the lighting devices 241 & 211 associated with the wagering game machine 210. The ELC 233 controls the lighting devices 242 & 231 associated with the wagering game machine 230, and the ELC 263 controls the lighting devices 243 & 261 associated with the wagering game machine 260. The ELCs 213, 233, & 263 are connected through a backend network 280. The backend network 280 can support the Ethernet protocol. The ELCs 213, 233, & 263 are also connected to a lighting network 250. The lighting network 250 can support the DMX 512 protocol. In some embodiments, one of the ELCs acts as a host ELC, where the host transmits lighting instructions over the lighting network 250, as similarly described vis-à-vis FIG. 1. In FIG. 2, the host ELC is indicated by a bold line (see 213).

The dataflow and operations for presenting a light show are shown in stages A-D. During stage A, the ELCs 213, 233 & 263 generate lighting commands in accordance with playlists associated with the ELCs. In some instances, a wagering game server (not shown) (or a wagering game machine or other component) selects the playlists in response to an events, such as win events, casino-wide celebration events, bonus events, etc. For example, a wagering game server can select particular playlists after detecting a jackpot win. The wagering game server can notify the ELCs about the playlist selection. The ELCs 213, 233, & 263 can generate the lighting commands based on executing scripts indicated by the playlists. The ELCs 233 & 263 can transmit the lighting commands to the host ELC 213. In the example shown in FIG. 2, the ELC 233 transmits a lighting command 265 (shown as "command 1"), and the ELC 263 transmits a lighting command 264 ("command 2" in FIG. 2) to the host ELC 213.

Just as the non-host ELCs generate commands, the host ELC 213 can also generate lighting commands based on the playlist(s). Because the host ELC 213 does not actually need to transmit commands, it may simulate transmission by placing the lighting commands in a local buffer that receives commands from the other ELCs.

The lighting commands can indicate actions for each of the lighting devices associated with the wagering game machines 210, 330, & 260. In FIG. 2, the command 264 indicates that the spotlight 242 should point at the wagering game machine 230 and the LED array 231 should present a circling light pattern. Similarly, the command 265 indicates that the spotlight 243 should point at the wagering game machine 230, and that the top portion 262 of the LED array 361 should flash in a pattern moving toward the wagering game machine 230. The host ELC's lighting command indicates that the spotlight 241 should point at the wagering game machine 230, and that the top portion 212 of the LED array 211 should flash in a pattern moving toward the wagering game machine 230.

At stage B, the host ELC 213 receives the commands 264 & 265. The host ELC 213 also "receives" its own lighting command. To maintain state information, all non-host ELCs receive the commands sent to the host, as similarly described vis-à-vis FIG. 1. The non-host ELCs maintain state information so they can assume responsibilities of the host ELC 213, should the host ELC 213 become unavailable.

At stage C, the host ELC 213 aggregates the commands and generates instructions for the lighting devices 241, 242, 243, 211, 231, & 261. Such aggregation can include translating the commands into a series of instructions that can be understood by the lighting devices 241, 242, 243, 211, 231, & 261 and/or network lighting controllers associated with the lighting devices. For example, instructions for the spotlights 241, 242, & 243 can include indicia for position, brightness, color, etc. As another example, instructions for the LED arrays 211, 231, & 261 can indicate a pattern (e.g., blinking, circulating, chasing, etc.), direction for pattern, active LED device portions, colors, etc.

As part of generating the lighting instructions, the host ELC 213 determines positions for the spotlights 241, 242, 243. In some embodiments, the host ELC 213 can determine the positions based on identifiers in the commands received from the ELCs (or from itself). In this example, the commands instruct the spotlights to point toward the wagering game machine 230. In some embodiments, the host ELC 213 looks-up a geographic position of the wagering game machine 230. Alternatively, the commands may indicate the position. The host ELC 213 can generate a first set of lighting instructions that cause the spotlights 241, 242, & 243 to move to the positions, thus pointing at the machine 230. The host 213 can insert the first set of instructions into a data packet (e.g., a DMX512 data packet). As described above, sections of the data packet may be reserved for each of the ELCs.

Also as part of generating the lighting instructions, the host ELC 213 can generate a second set of instructions to initiate lighting effects on the LED arrays 211, 231, & 261. The host ELC 213 can generate the second set of instructions based on the commands 264 & 265, and its own instructions. The commands can include parameters for programming the LED arrays 211, 231, & 261 (e.g., parameters indicating patterns, active portions of the LED arrays, etc.). Based on the commands, the host ELC 213 determines that the top sections 212 & 262 of the LED arrays 211 & 261 should be active, whereas all sections of the LED array 231 should be active. The host ELC 213 also determines that the pattern for the LED array 231 should be circulating, while the pattern direction should be clockwise for LED array 211, and counter-clockwise for LED array 231. The host ELC 213 generates the appropriate lighting instructions, and inserts them into the data packet along with the first set of instructions.

At stage D, the host ELC 213 transmits, via the lighting network 250, the instructions to the lighting devices 241, 242, 243, 211, 231, & 261. Transmitting the instructions can comprise transmitting the data packet, which contains the first and second sets of instructions. In some embodiments, the host ELC 213 transmits the instructions to a network lighting controller (not shown) associated with the lighting devices 241, 242, 243, 211, 231, & 261. In response, network lighting controller can process the data packet to determine instructions for each of the lighting devices 241, 242, 243, 211, 231, & 261. Next, the network lighting controller can execute the instructions to cause the lighting devices 241, 242, 243, 211, 231, & 261 to react according to the instructions.

In some embodiments, the host ELC 213 communicates with the network lighting controller based on the lighting network's frame rate. Thus, some embodiments of the network lighting controller expect to receive one data packet per frame, where each data packet includes instructions for each presentation device. For some commands, the host ELC 213 may generate more than one lighting instruction. For example, the host ELC 213 may receive a command indicating that a color of the spotlight 241 should transition from a first color (e.g., red) to a second color (e.g., orange) over a one second time period. However, instructions for the spotlight 241 may not accommodate such color transitions. Thus, the host ELC 213 may generate a number of instructions to complete the command, based on the number of frames it can transmit over the one second time period. The host ELC 213 can use any suitable step function to determine the transition. Using the step function, the host ELC 213 can determine a number of color values for the color transition, and can generate instructions based on the colors values. Next, the host ELC 213 can transmit, in each frame, one instruction for the spotlight 241. When executed, the instructions incrementally transition the spotlight 341 from the first color to the second color over the one second time period.

Sometimes lighting devices do not transition between states (e.g., colors) in every frame. Instead, the lighting devices may remain in a given state over several frames. If a lighting device should remain in a given state, the host ELC 213 can transmit an instruction indicating no change. For example, the host ELC 213 may receive a command indicating that the spotlight 243 should be pointed at the wagering game machine 260 indefinitely. In response, the host ELC 213 can generate an instruction indicating the wagering game machine's 260 position for the spotlight 243, and transmit the instruction to the spotlight 243. During successive frames, the host ELC 213 may transmit "no operation" instructions to the spotlight 243, causing no change to the spotlight 243 (i.e., keeping the light 243 pointing at the wagering game machine 260).

Example Operations

This discussion continues with a description of operations associated with some embodiments of the invention. This discussion will describe the operations as represented in the flow diagrams (a.k.a. flowcharts) of FIGS. 3 and 4. In some instances, the operations are described with reference system components presented above. However, according to some embodiments, the operations can be performed by components that are not described herein. Furthermore, in certain embodiments, the operations described herein can be performed by executing instructions residing on machine-readable storage media (e.g., software). In other embodiments, the operations are performed by hardware, by firmware, or other components. In some embodiments, the operations can be performed in series, while in other embodiments, one or more of the operations can be performed in parallel. Moreover, some embodiments can perform less than all the operations shown in any flow diagram or other drawing.

Figure 3:
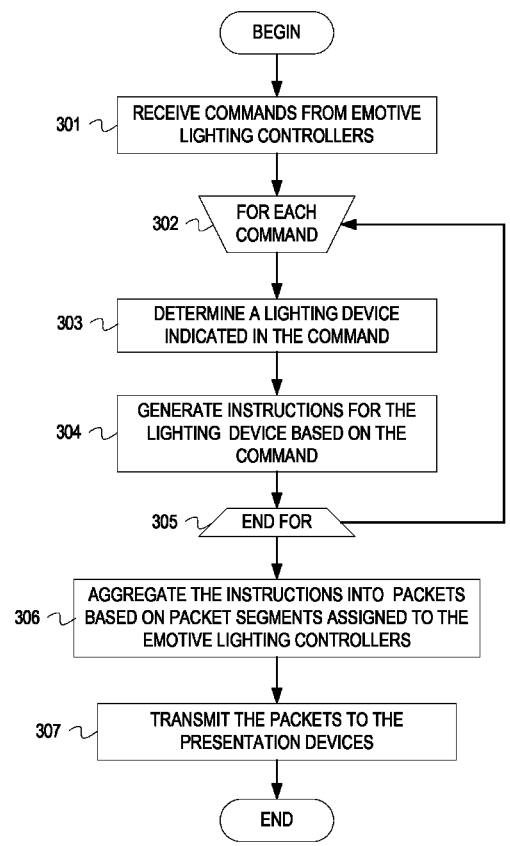
FIG. 3 is a flowchart depicting operations for processing lighting commands, according to some embodiment of the invention.

FIG. 3 is a flowchart depicting operations for processing lighting commands, according to some embodiment of the invention. Flow begins at block 301, where a host ELC receives commands from one or more ELCs. The ELCs can transmit commands to the host ELC in accordance with playlists. The host ELC can also generate commands and deliver the commands to itself (e.g., insert commands into its own input buffer). Each of the ELCs transmits commands for lighting devices that they are responsible for controlling. In some embodiments, all ELCs receive duplicate copies of all the commands, so each ELC can maintain accurate state information. The transmissions are received over a network that is independent of any dedicated lighting network. Furthermore, the Flow continues at block 302.

At block 302, a loop begins for each command received by the host ELC. Flow continues at block 303.

At block 303, the host ELC determines a lighting device indicated in the command. In some instances, the host ELC determines the lighting device based on an identifier (e.g., an integer value) in the command. The host ELC can also determine which ELC that transmitted the command (e.g., based on an integer value or other identifier). Flow continues at block 304.

At block 304, the host ELC generates instructions for the lighting device based on the command. For example, the host ELC may receive a command indicating that brightness of a light should be transitioned from low to high over two seconds. In some instances, the host ELC may also determine an instruction format for the lighting device (e.g., based on the identifier indicated in the command). For a brightness command, more than one instruction may be needed to carry-out the command if the lighting device's instructions only support a single brightness level for each instruction. If multiple instructions are needed for the command, the host ELC determines a number of instructions/frames in the two second time interval, based on a lighting network frame rate. Then, the host ELC determines how much to increment brightness during each frame, and generates instructions to incrementally change the brightness over the two seconds. Flow continues at block 305.

At block 305, the loop for each instruction ends. If the host ELC has received additional commands, flow continues at block 302. If the host ELC has not received additional commands, flow continues at block 306.

At block 306, the host ELC aggregates the instructions into data packets based on packet segments assigned to the ELCs. A single packet can include one instruction for each of the lighting devices associated with a bank of wagering game machines. As described vis-à-vis FIG. 1, the host ELC can insert each ELC's instructions into packet segments reserved for that ELC. Each packet segment may be organized such that a particular lighting device's instructions go in specific bytes of the segment (e.g., the high order five bytes may control a particular spotlight, whereas the next four bytes control an LED array). The host ELC transmits one packet to a network lighting controller per network transmission frame. If a particular command takes more than one instruction to complete, the host ELC can insert successive instructions into successive packets. If a command has not been received for one of the lighting devices, the host ELC can insert instructions indicating that no change should occur for the lighting device. Flow continues at block 307.

At block 307, the host ELC transmits the packets to the lighting devices. For example, the host ELC transmits the packets over an RS-485 cable at a rate of 40 frames/packets per second. In some embodiments, a lighting controller separate from the lighting device receives and executes the instructions, causing the lighting device to carry out the lighting effect (e.g., changing a light's brightness). In other embodiments, the controller is incorporated into the lighting device.

In some embodiments, the ELCs can be listening to the packet transmissions made by the host ELC. The non-host ELCs can record the packets to maintain state information. Thus, the state information can include both the commands and the instructions. If the host ELC becomes unavailable, one of the other ELCs can be selected as host, and the new host ELC can utilize the state information to continue transmitting instructions where the previous host ELC left off.

Figure 4:
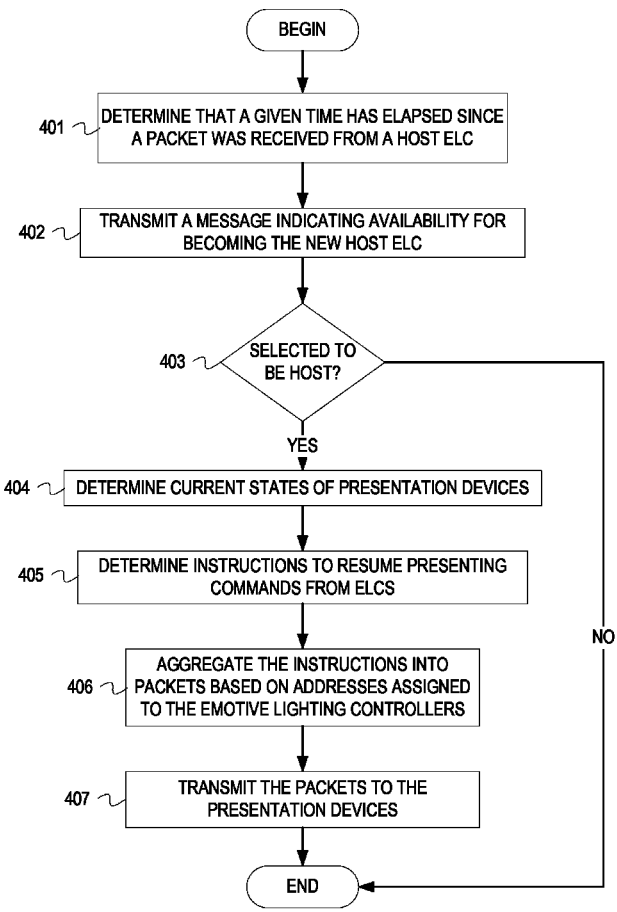
FIG. 4 is a flowchart depicting operations for resuming a presentation after a host ELC becomes unavailable.

FIG. 4 is a flowchart depicting operations for resuming a presentation after a host ELC becomes unavailable. Flow begins at block 401, where an ELC determines that a data packet has not been received from a host ELC for a given time. For example, if the host ELC should be transmitting, over the lighting network 150, data packets at a frame rate of 40 frames/packets per second. If the ELC has not received a data packet for ten seconds (400 frames), the ELC determines that the host ELC is unavailable. Embodiments can be configured to wait any suitable time period before determining a host ELC is not available. Flow continues at block 402.

At block 402, the ELC transmits a message indicating availability for becoming the host ELC. In some instances, the ELC transmits the message to a wagering game server to inform the wagering game server that the ELC is available to become the host. In some embodiments, if there are multiple ELCs, the wagering game server may receive many such messages. However, in other embodiments, the network's communication arbitration policy allows only one available ELC to transmit such a message to the wagering game server. For example, according to one arbitration policy, multiple available ELCs may request to send a message indicating availability to be host. However, only one ELC obtains permission to transmit the message. According to the policy, the ELCs (i.e., the ELCs that did obtain permission to transmit) remove the message from their transmit buffers. Thus, the wagering game server may receive only one message indicating that an ELC is available to become host.

Next, the wagering game server can select one of the ELCs to be the new host. For example, the wagering game server can select the new host based on a round robin, least recently used, most reliable, or any other suitable selection technique. In some embodiments, the wagering game server selects the only ELC from which it received a message. Flow continues at block 403.

At block 403, the ELC determines whether it has been selected to be the host. For example, after the wagering game server selects a new host, the wagering game server sends, to all of the available ELCs, a message identifying the new host. The ELC knows it is the new host if it receives a messaging identifying it as the new host. If the ELC has been selected, flow continues at block 404. If the ELC has not been selected, flow ends.

At block 404, the ELC has been selected as the new host, so the new host ELC determines current states of the lighting devices. As noted above, the previous host ELC broadcast data packets to all ELCs. In some instances, the new host ELC determines the current states based on one or more data packet received from the previous host ELC. Flow continues at block 405.

At block 405, the new host ELC determines which instructions are needed to resume processing of the commands. For example, before the previous host became unavailable, the ELC received commands over a backend network, and it generated instructions based on the commands (as part of a process for maintaining state information). Instead of aggregating and transmitting the instructions, the ELC stored the instructions in memory. Now operating as the new host, the ELC can examine the last packet received from the previous host, and begin transmitting succeeding instructions. Flow continues at block 406.

At block 406, the new host ELC aggregates the instructions into data packets based on packet segments reserved for the ELCs. Aggregating the instructions can comprise determining bytes allocated to the lighting devices in the packet segments of each ELC. Next, the new host ELC can insert the instructions in the appropriate bytes in the packet segments. Flow continues at block 407.

At block 407, the new host ELC transmits the data packets to the lighting devices. In some embodiments, the new host ELC transmits the data packets to lighting controllers separate from the lighting devices. The new host ELC may generate and transmit multiple packets per frame if more than one lighting controller is associated with the lighting devices.

Although some of the foregoing examples refer to ELCs being associated with wagering game machines, embodiments are not so limited. Some ELCs are not associated with any of the wagering game machine, but may reside in a bank of wagering game machines to control overhead devices.

In some instances, a wagering game server, not the ELCs, maintains state information. If the wagering game server detects that a host ELC is unavailable (e.g., via notification from non-host ELCs), it can push state information to new host ELC.

ELCs and Coordinated Media Shows

Events in a wagering game system may trigger coordinated media shows that involve a plurality of media devices (e.g., lighting devices, audio devices, video devices, etc.) in a bank of wagering game machines. For example, after a player at a wagering game machine wins a large jackpot, the system may want to present a coordinated media show involving lighting devices associated with all wagering game machines in the bank. Such a coordinated media show may include media effects that draw attention to a winning player, such as by streaking lighting across the bank toward the player, playing lively music throughout the bank, etc. The system can coordinate presentation of the media content by having one ELC present primary media content, while other ELCs present accompanying media content. For example, the primary media content may cause very bright flashing lights on the winning wagering game machine, whereas the accompanying media content causes streaking lights on the other wagering game machines. As a whole, the primary and accompanying media content draw attention to the winning wagering game machine.

When coordinating media across one or more banks of wagering game machines, the ELCs can synchronize accompanying media with the primary media. For example, a coordinated media show may call for presentation of one media effect (e.g., bright light flash at multiple machines) after another media effect has been presented (e.g., after a sound has been presented). Some embodiments of the inventive subject matter enable ELCs to determine when a particular media effect has occurred, and synchronize other media effects to occur after the particular effect. Furthermore, some embodiments can synchronize media effects on various events in the wagering game system, such as game events, game outcomes, player achievements, casino conditions, etc.

Figure 5:
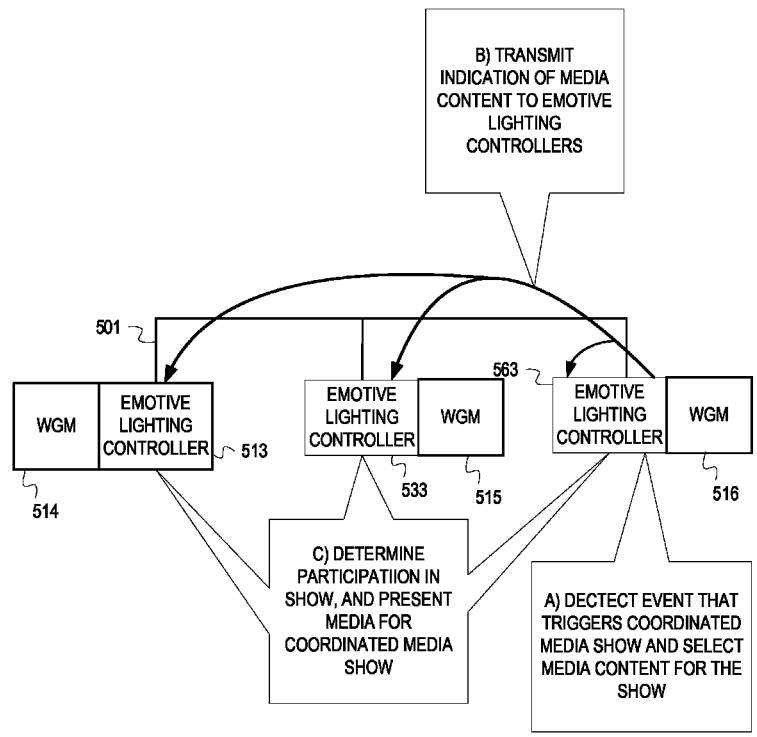
FIG. 5 is a conceptual diagram showing how ELCs can present a coordinated media show, according to embodiments of the invention.

The following discussion of FIG. 5 explains how some embodiments can coordinate media shows across a bank of wagering game machines. The discussion of FIGS. 6-8 explains how system components can synchronize media effects during such coordinated media shows.

FIG. 5 is a conceptual diagram showing how ELCs can present a coordinated media show, according to embodiments of the invention. FIG. 5 shows a bank of wagering game machines 514, 515, & 516. The wagering game machines 514, 515, & 516 are associated with ELCs 513, 533, & 563, respectively. In FIG. 5, ELCs 513, 533, & 563 are connected to a backend network 501. The backend network 501 can be configured so that broadcasts arrive at all ELCs at the same time (i.e., the backend network can be a "multi-drop network"). In some embodiments, the backend network 501 can connect the ELCs 513, 533, & 563 together via RS-485 cabling. In other embodiments, the backend network 501 can be configured as an Ethernet network, where network traffic conditions allow for broadcasts to arrive at all ELCs substantially contemporaneously. In yet other embodiments, the back end network 501 can include any other suitable networking technology. Although not shown, the ELCs 513, 533, & 563 can also be connected to a dedicated lighting network, and they can control lighting devices on the dedicated lighting network (e.g., as described vis-à-vis FIG. 1).

At stage A (in FIG. 5), the ELC 563 detects an event that triggers a coordinated media show, and determines media content for the coordinated media show. The event can be any suitable event in a wagering game system, such as a suitably large jackpot, player achievement, etc. For example, the wagering game machine 516 can detect a win that exceeds a certain dollar amount. As a result, the wagering game machine 516 can transmit a message to the ELC 563 requesting initiation of the coordinated media show. As another example, the wagering game machine 516 may detect that a community bonus game has been activated on the bank, and transmit a message to the ELC 563 requesting initiation of a coordinated media show. In other embodiments, the wagering game machine 516 does not request the coordinated media show. Instead, the wagering game machine may notify the ELC 563 about the event, where the event causes the ELC 563 itself to initiate the coordinated media show.

In selecting media content, the ELC 563 can select playlists for itself and the other ELCs, where the playlists are associated with instructions that present selected media on media devices associated with the bank (e.g., media devices included in the wagering game machines 514, 515, & 516). In some instances, the ELC 563 can determine an event type (e.g., large jackpot, community bonus game, etc.), and use the event type as an index into a database to determine the playlists. In other instances, wagering game machine 516 can identify playlists in messages it sends to the ELC 563.

At stage B, the ELC 563 notifies other ELCs about media content for the coordinated media show. In some embodiments, the ELC 563 transmits playlist identifiers to ELCs that will participate in the coordinated presentation. In FIG. 5, the ELC 563 broadcasts a message containing the playlist identifiers to the ELCs 513, 533, & 563. The message can indicate particular playlists for each of the ELCs 513, 533, & 563.

During stage C, after the ELCs 513, 533, & 563 receive the playlist identifiers, they determine whether to participate in the coordinated media show. In some embodiments, ELCs determine whether to participate in coordinated media shows based on their location relative to the ELC that initiated the show, the playlist identifier, and/or any other suitable criteria. Participating ELCs can retrieve their corresponding playlists from a local or remote database. The ELC 563 initiated the coordinated presentation, so it can present a primary playlist (i.e., primary media content), whereas the other ELCs 513 & 533 can present accompanying playlists (i.e., accompanying media content). The primary and accompanying playlists can be the same or different.

Also during stage C, the ELCs 513, 533, & 563 present media for the coordinated media show. For example, each ELC may present media identified during stage A. In some embodiments, the ELCs 513, 533, & 563 present media by executing scripts (i.e., instructions) associated with playlists received during stage A. Although FIG. 5 shows all ELCs participating in the media show, all ELCs may not participate in all shows (e.g., see discussion above of ELCs determining participation).

While the discussion of FIG. 5 describes coordinated media shows in general, the following discussion provides more details about some embodiments. Coordinated media presentations can include sound, video, and lighting effects. For example, lighting effects are often closely related to audio effects. In some presentations, certain lighting effects should be presented after a sound clip. However, the sound clip may be randomly chosen or otherwise unknown to some ELCs. Thus, using pre-set transitions between lighting effects may result in unsynchronized audio and lighting. According to some embodiments, an ELC that initiates a coordinated media show can monitor media streams to detect synchronization triggers. When an ELC detects a synchronization trigger, the ELC can transmit a synchronization marker to cause other ELCs participating in the coordinated presentation to contemporaneously transition from one lighting effect to another.

Figure 6:
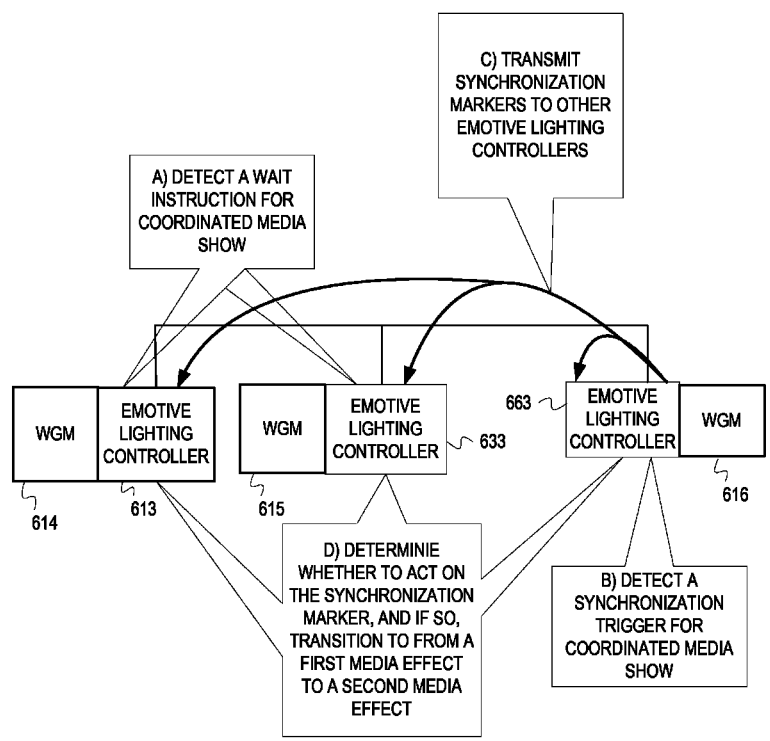
FIG. 6 is a conceptual diagram showing operations for synchronizing media transitions during coordinated media shows.

FIG. 6 is a conceptual diagram showing operations for synchronizing media transitions during coordinated media shows. In FIG. 6, ELCs 613, 633, & 663 are connected to a backend network 601. The backend network 601 can be configured as a multi-drop network. The ELCs 613, 633, & 663 are associated with wagering game machines 614, 615 & 616, respectively. The ELCs 613, 633, & 663 can also be connected to a dedicated lighting network, and each of them can control a subset of lighting devices on the dedicated lighting network (e.g., as described vis-à-vis FIG. 1). The dedicated lighting network and the lighting devices are not shown. In this example, the ELCs 613, 633, & 663 are participating in a coordinated presentation initiated by the ELC 663.

In FIG. 6, stages A-C show operations and data flow for synchronizing media in a coordinated media show. Such a coordinated media shows may celebrate jackpot wins, progressive jackpot wins, player accomplishments (e.g., a player's tenth royal flush, etc.), etc. As noted above, the ELCs may present the coordinated show's media content by executing scripts that cause the ELCs to present various media effects, such as lighting effects, audio effects, etc. In some embodiments, the scripts may include synchronization indicators that instruct ELCs to wait for certain events and/or conditions, and to notify other ELCs when those events and/or conditions have occurred. For some embodiments, before performing stages A-C of FIG. 6, the ELCs 613, 633, & 663 initiate a coordinated media show by performing operations of FIG. 5. Thus, just before stage A in FIG. 6, all the ELCs are presenting media effects for a coordinated media show. For example, the ELC 663 may be presenting primary content for the show, while the ELCs 613 & 633 are presenting accompaniment.

At stage A, the ELCs 613 & 633 are waiting for a synchronization marker. For example, the ELCs 613 & 633 have encountered an instruction, in a script, that instructs them to wait for a synchronization marker before proceeding with different media effects. In some instances, the ELCs 613 & 633 may continue to present certain media effects while waiting for the synchronization marker. For example, the ELCs 613 & 633 may continue streaking lights toward the wagering game machine 616 until they detect a synchronization marker.

At stage B, while presenting media for the coordinated show, the ELC 663 detects a synchronization trigger associated with the media. In some embodiments, the ELC 663 encounters an instruction (e.g., in a script) directing the ELC 663 to begin detecting for a synchronization trigger. Synchronization triggers can include events in a media stream, such as fade out/in, beginning/end, a tone, an image, an explicit synchronization identifier, etc. Synchronization triggers can also include game events on the bank or remote gaming network, events on a social network, etc. Thus, the ELC 663 can monitor an audio clip for its end, where the end is a synchronization trigger.

At stage C, the ELC 663 transmits synchronization markers to the ELCs. For example, the ELC 663 broadcasts the synchronization markers to itself and the other ELCs 613 & 633. The ELC 663 broadcasts to itself because, like the other ELCs, it may be waiting for a synchronization marker before it transitions to another media effect. In some instances, some ELCs may receive the synchronization marker, but ignore it.

At stage D, the ELCs 613, 633, & 663 determine whether to act on the synchronization markers. For ELCs acting on the markers, they transition from one media effect to another media effect. In some embodiments, the ELCs launch a second script in the playlist, after receiving the synchronization markers. By executing the second script, the ELCs 613, 633, & 663 can synchronously present different media effects. The ELCs can repeat stages A-D as needed. In some embodiments, the synchronization markers can be data packets including a particular ASCII character string. In other embodiments, the synchronization markers may be represented by any suitable data.

This discussion continues with more details about how some embodiments can present coordinated media shows across a bank of wagering game machines.

FIGS. 7 and 8 are conceptual diagrams depicting operations for presenting coordinated media shows, according to some embodiments of the invention. In FIG. 7, ELCs 701, 702, & 703 can be connected together by a multi-drop network (e.g., RS485, Ethernet, etc.) that allows messages transmitted by any one ELC to be received substantially simultaneously by all of the other ELCs. Each of the ELCs 701, 702, & 703 can be associated with a wagering game machine in a bank, and can be responsible for controlling lighting devices associated with the wagering game machine.

At stage 702:1, the ELC 702 determines that a coordinated media presentation should be started. For example, a wagering game server may determine that a casino-wide celebration should occur because a player, on a wagering game machine outside of the bank, has accumulated a certain amount of winnings A wagering game server can transmit, to the ELC 702, a request to start the coordinated presentation. Such a request may indicate a playlist for the coordinated media presentation. As another example, a wagering game machine (not shown in FIG. 7) associated with the ELC 702 detects that a player has advanced to a new level in an episodic wagering game. In response, the wagering game machine sends a request to the ELC 702 to begin the coordinated presentation that celebrates the player's achievement.

At stage 702:2, the ELC 702 determines a primary playlist to present during the coordinated presentation. In some embodiments, the primary playlist identifies one or more scripts that, when processed by the ELC 702, cause the ELC 702 to present media effects such as lighting effects, audio effects, etc. In some instances, the primary playlist is included in a request received at stage 702:1. In other instances, the ELC 702 determines the primary playlist based on a celebration type or event indicated in the request. The ELC 702 can use the celebration type to look-up the primary playlist in a database.

At stage 702:3, the ELC 702 determines accompanying playlists for the other ELCs 701 & 703 to present during the coordinated presentation. In some instances, the ELC 702 determines the accompanying playlists based on the primary playlist's identifier. The ELC 702 can locate the primary playlist's identifier in an accompanying playlist database to determine the accompanying playlists. In other instances, the ELC 702 can determine the accompanying playlists based on indications (e.g., celebration type, playlist identifiers, etc.) in a request received at 702:1. The primary and accompanying playlists may be the same playlist or different playlists. For example, the primary playlist may be different from the accompanying playlists, but all of the accompanying playlists may be the same. As another example, all of the primary and accompanying playlists are different.

At stage 702:4, the ELC 702 transmits indications of the accompanying playlists to the ELCs 701 & 703 and places an indication of the primary playlist in its own receiving buffer. In some instances, the ELC 702 broadcasts the playlists over a multi-drop network connecting the ELCs. Thus, the ELCs 701, 702, & 703 can receive the identifiers of the primary and accompanying playlists at substantially the same time, and they can substantially contemporaneously retrieve the primary and accompanying playlists from a playlist database based on the identifiers (see 701:5, 702:1, and 703:1). In some embodiments, each ELCs retrieves the playlist from a local database residing in the ELC itself or its associated wagering game machine. In other embodiments, the ELCs retrieve the playlists from one or more remote databases. The operations continue in FIG. 8.

FIG. 8 continues from FIG. 7. After processing the first scripts, the ELCs 701, 702, & 703 perform stages 701:2, 702:6, & 703:2 in parallel (timing can be substantially contemporaneous or at different times).

At stage 702:6, the ELC 702 determines that it should search for a synchronization trigger. The synchronization trigger can indicate a transition from one media effect to another, such as a transition between two different lighting effects. During stage 702:6, the ELC 702 monitors a media clip (e.g., a video clip, an audio clip, etc.) for the synchronization trigger. For example, in the coordinated media show, a first script may play a video on an overhead display device associated with the bank. The ELC 702 determines, based on the playlist, that a transition from the first script to the second script should occur at the end of the video. The video may have been selected randomly, so the ELC 702 does not know when the video will end. Thus, the ELC 702 can monitor the video to detect an end.

At stages 701:2 and 703:2 the ELCs 701 & 703 wait for the synchronization trigger. Continuing the video example above, the ELCs 701 and 703 should also wait for the end of the video before presenting a different media effect. While waiting, the ELCs may be presenting media effects. When the ELC 702 detects the synchronization trigger in the media clip (e.g., the end of the video), it proceeds to stage 702:7. At stage 702:7, the ELC 702 transmits a synchronization marker to the ELCs 701, 702, & 703. For example, the ELC 702 broadcasts the synchronization marker over the multi-drop network. The ELCs 701, 702, & 703 receive the synchronization trigger substantially simultaneously. In response to receiving the synchronization trigger, the ELCs 701, 702, & 703 perform stages 701:3, 702:9, and 703:3, respectively.

At stage 702:9, the ELC 702 transitions to a second script in the primary playlist. At substantially the same time (see stages 701:4 and 703:4), the ELCs 701 & 703 also transition to second scripts in their respective accompanying playlists. As the ELCs process the second scripts, they present different media effects.

Although the discussion of FIGS. 7 & 8 describes ELCs detecting a transition trigger in a video clip, ELCs can detect triggers in any suitable media, such as lighting media, audio, and video. Moreover, the ELCs can also detect triggers in game events, events in the gaming network, events in internet-based social networks, etc.

More about Wagering Game Machines

This section includes discussion about wagering game machines and wagering game networks.

Wagering Game Machine Architectures

Figure 9:
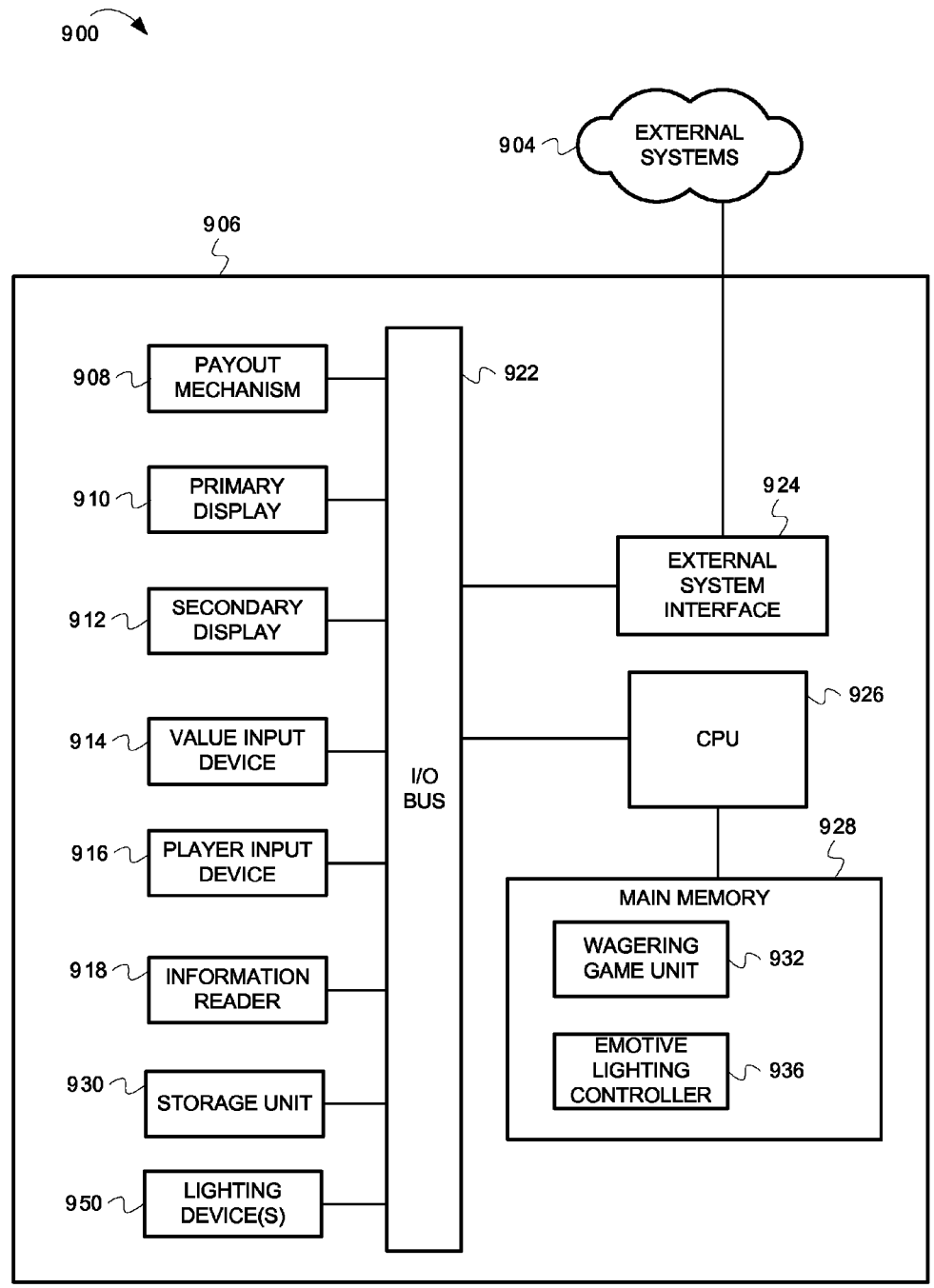
FIG. 9 is a block diagram illustrating a wagering game machine architecture, according to example embodiments of the invention.

FIG. 9 is a block diagram illustrating a wagering game machine architecture, according to example embodiments of the invention. As shown in FIG. 9, the wagering game machine architecture 900 includes a wagering game machine 906, which includes a central processing unit (CPU) 926 connected to main memory 928. The CPU 926 can include any suitable processor, such as an Intel® Pentium processor, Intel® Core 2 Duo processor, AMD Opteron™ processor, or UltraSPARC processor. The main memory 928 includes a wagering game unit 932. In one embodiment, the wagering game unit 932 can present wagering games, such as video poker, video black jack, video slots, video lottery, etc., in whole or part. The main memory also includes an emotive lighting controller 936. The emotive lighting controller 936 is responsible for controlling lighting devices assigned to, proximate to, or in other ways associated with the wagering game machine 906. The emotive lighting controller 936 can be configured to control synchronization data between wagering game machines within a machine bank including synchronization of emotive light presentation data, such as media including audio, video, lighting effects, etc. Although FIG. 9 shows the emotive lighting controller 936 embodied as instructions residing in the wagering game machine's main memory and executable on the CPU 926, other embodiments may be embodied differently (e.g., in other embodiments the emotive lighting controller may be an application specific integrated circuit, a field programmable gate array, a microcontroller, etc.).

The CPU 926 is also connected to an input/output (I/O) bus 922, which can include any suitable bus technologies, such as an AGTL+ frontside bus and a PCI backside bus. The I/O bus 922 is connected to a payout mechanism 908, primary display 910, secondary display 912, value input device 914, player input device 916, information reader 918, storage unit 930, and lighting device(s) 950. The player input device 916 can include the value input device 914 to the extent the player input device 916 is used to place wagers. The I/O bus 922 is also connected to an external system interface 924, which is connected to external systems 904 (e.g., wagering game networks).

In one embodiment, the wagering game machine 906 can include additional peripheral devices and/or more than one of each component shown in FIG. 9. For example, in one embodiment, the wagering game machine 906 can include multiple external system interfaces 924 and/or multiple CPUs 926. In one embodiment, any of the components can be integrated or subdivided.

Any component shown in the architecture 900 (and in any other drawing discussed herein) can include hardware, firmware, and/or machine-readable storage media including instructions for performing the operations described herein. Machine-readable storage media includes any tangible mechanism that stores and provides information in a form readable by a machine (e.g., a wagering game machine, computer, etc.). For example, machine-readable storage media include read only memory (ROM), random access memory (RAM), magnetic disk storage media, optical storage media, flash memory machines, etc.

While FIG. 9 describes an example wagering game machine architecture, this section continues with a discussion wagering game networks.

Emotive Lighting Controllers

Figure 10:
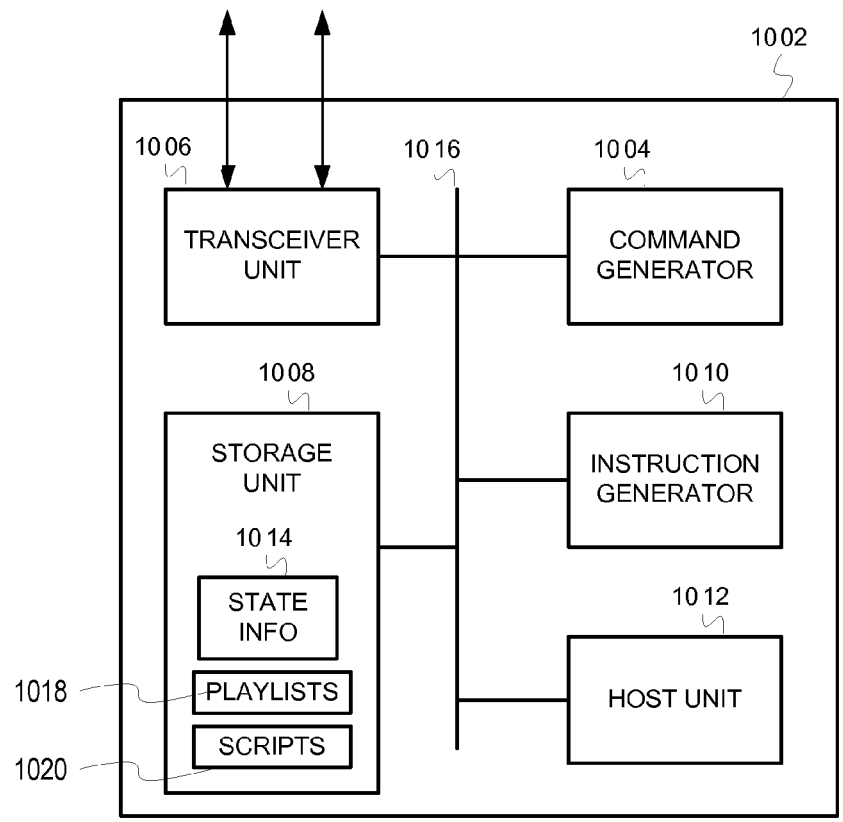
FIG. 10 is a block diagram illustrating an emotive lighting controller, according to some embodiments of the invention.

FIG. 10 is a block diagram illustrating an emotive lighting controller, according to some embodiments of the invention. In FIG. 10, an emotive lighting controller 1002 includes a transceiver unit 1006, host unit 1012, command generator 1004, instruction generator 1010, storage unit 1008. As shown, the components can communicate with each other via the communication interface 1016, which can include a bus, wires, software interfaces, and/or any other suitable interface technology.

The transceiver unit 1006 can transmit and receive data (e.g., playlists, instructions, commands, etc.) over a plurality of networks. In some instances, the transceiver unit 1006 responds to requests from the ELC's other components, and utilizes the storage unit 1008.

The host unit 1012 determines whether the ELC 1002 is in host mode or non-host mode. If the ELC 1002 is in host mode, the host unit 1012 controls receipt of lighting commands, and generation of lighting device instructions. The host unit 1012 can retrieve the commands from the storage unit 1008, and initiate the instruction generator 1010 to generate lighting device instructions based on the commands. The instruction generator 1010 can employ step functions and other methods for determining instructions. The host unit 1012 can transmit the instructions for execution on lighting devices. The host unit 1012 can also utilize the command generator to generate commands based on playlist.

If the ELC 1002 is in non-host mode, the host unit 1012 utilizes the transceiver unit 1006 to receive commands from other non-host ELCs. The host unit 1012 can store the commands as state information in the storage unit 1008. If a designated host ELCs becomes unavailable, the host unit 1012 can offer to become host, and utilize the state information 1014 if the ELC 1002 becomes host.

In some embodiments, the host unit 1012 can process playlists 1018, and execute scripts 1020 identified in the playlists. As part of playlist processing, the host unit 1012 can present media effects (e.g., playback recorded audio and video, control lighting devices, generate sound effects and video effects, and other effects described herein). The host unit 1012 can also detect synchronization triggers associated with the media effects, and can notify other ELCs about the synchronization triggers.

In some embodiments, one or more of the components shown in FIG. 10 can be part of a wagering game machine or other wagering game network components. For example, all the components may reside in a wagering game machine or wagering game server. The components shown in FIG. 10 can perform any of the operations described herein. Furthermore, the ELC's components can include hardware and/or machine-readable storage media including instructions that can be executed to perform the operations described herein. For example, the host unit 1012 can be embodied as software executing on a processor (e.g., a processor residing in a wagering game machine).

Wagering Game Networks

Figure 11:
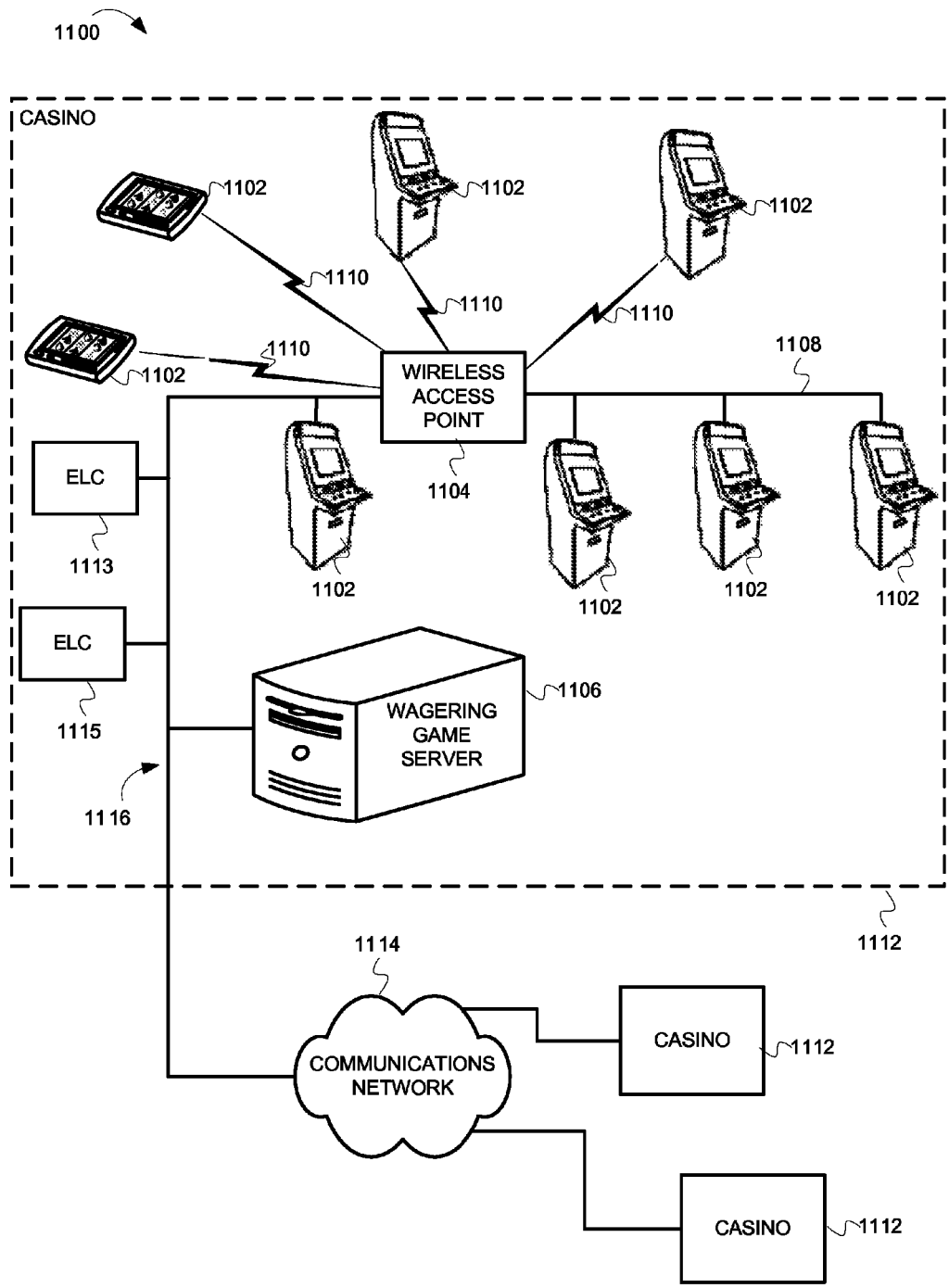
FIG. 11 is a block diagram illustrating a wagering game network 1100, according to example embodiments of the invention.

FIG. 11 is a block diagram illustrating a wagering game network 1100, according to example embodiments of the invention. As shown in FIG. 11, the wagering game network 1100 includes a plurality of casinos 1112 connected to a communications network 1114.

Each casino 1112 includes a local area network 1116, which includes an access point 1104, a wagering game server 1106, and wagering game machines 1102. The access point 1104 provides wireless communication links 1110 and wired communication links 1108. The wired and wireless communication links can employ any suitable connection technology, such as Bluetooth, 802.11, Ethernet, public switched telephone networks, SONET, etc. In some embodiments, the wagering game server 1106 can serve wagering games and distribute content to devices located in other casinos 1112 or at other locations on the communications network 1114. Each casino can also include a lighting network separate from the local area network 1116.

The wagering game machines 1102 described herein can take any suitable form, such as floor standing models, handheld mobile units, bartop models, workstation-type console models, etc. Further, the wagering game machines 1102 can be primarily dedicated for use in conducting wagering games, or can include non-dedicated devices, such as mobile phones, personal digital assistants, personal computers, etc. In one embodiment, the wagering game network 1100 can include other network devices, such as accounting servers, wide-area progressive servers, player tracking servers, and/or other devices suitable for use in connection with embodiments of the invention.

In some embodiments, wagering game machines 1102 and wagering game servers 1106 work together such that a wagering game machine 1102 can be operated as a thin, thick, or intermediate client. For example, one or more elements of game play may be controlled by the wagering game machine 1102 (client) or the wagering game server 1106 (server). Game play elements can include executable game code, lookup tables, configuration files, game outcome, audio or visual representations of the game, game assets or the like. In a thin-client example, the wagering game server 1106 can perform functions such as determining game outcome or managing assets, while the wagering game machine 1102 can present a graphical representation of such outcome or asset modification to the user (e.g., player). In a thick-client example, the wagering game machines 1102 can determine game outcomes and communicate the outcomes to the wagering game server 1106 for recording or managing a player's account.

In some embodiments, either the wagering game machines 1102 (client) or the wagering game server 1106 can provide functionality that is not directly related to game play. For example, account transactions and account rules may be managed centrally (e.g., by the wagering game server 1106) or locally (e.g., by the wagering game machine 1102). Other functionality not directly related to game play may include power management, presentation of advertising, software or firmware updates, system quality or security checks, etc.

Each casino also includes one or more ELC (see 1113 & 1115) capable of controlling light shows, as described herein.

Any of the wagering game network components (e.g., the wagering game machines 1102) can include hardware and machine-readable storage media including instructions for performing the operations described herein.

Wagering Game Machines

Figure 12:
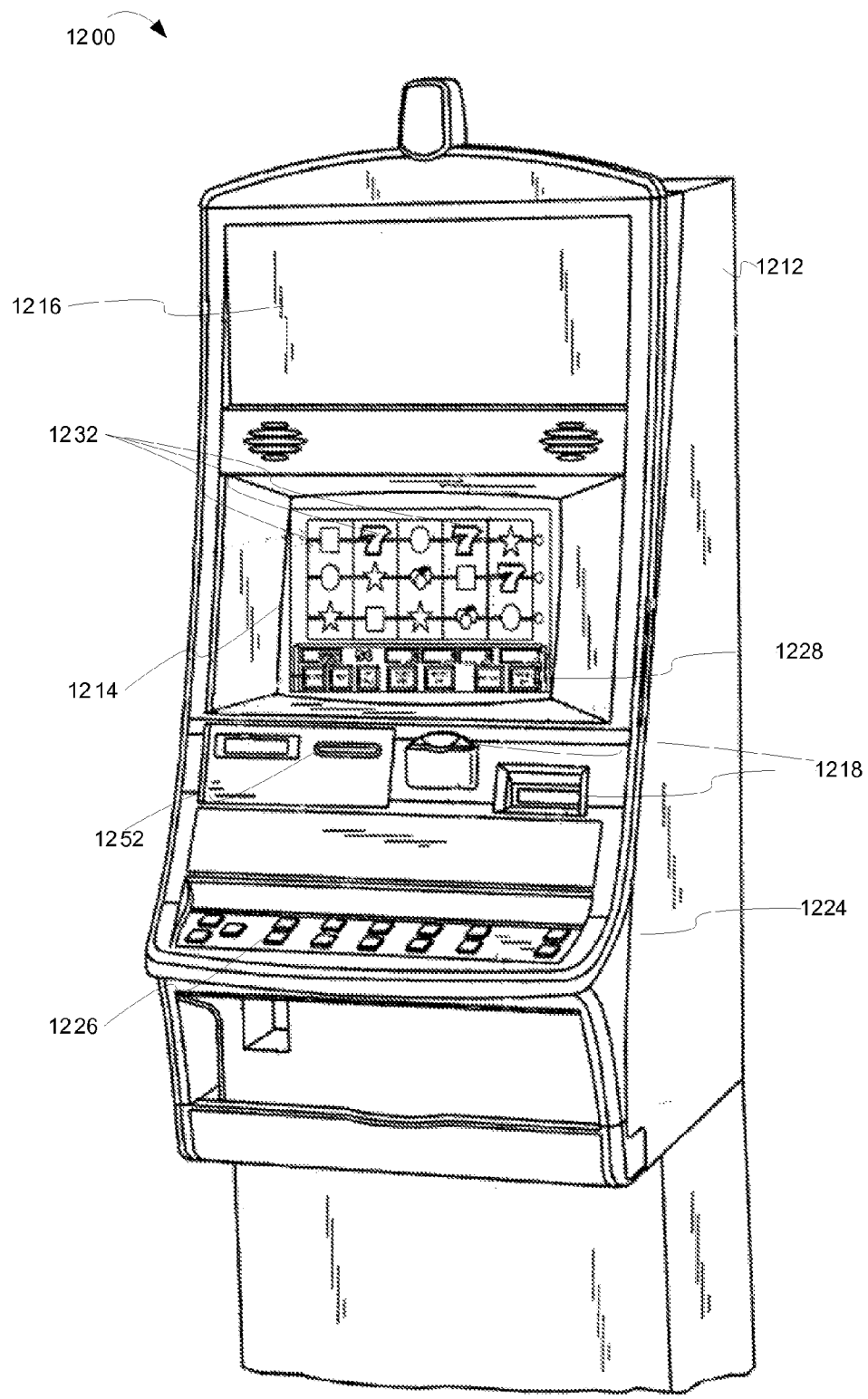
FIG. 12 is a perspective view of a wagering game machine, according to example embodiments of the invention.

FIG. 12 is a perspective view of a wagering game machine, according to example embodiments of the invention. Referring to FIG. 12, a wagering game machine 1200 is used in gaming establishments, such as casinos. According to embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bar top model, mobile handheld model, or workstation console model.

A player begins playing a basic wagering game by making a wager via the value input device 1218. The player can initiate play by using the player input device's buttons or touch screen 1228. The basic game can include arranging a plurality of symbols along a payline 1232, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

Although not shown in FIG. 12, the wagering game machine 1200 can include one or more ELCs. Additionally, the machine 1200 can include lighting devices capable of presenting lighting effects, as described herein.

General

Embodiments of the inventive subject matter can include any combination of the functionality and structure described herein. Furthermore, this detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. In addition to these examples, other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. One or more non-transitory machine-readable storage media including instructions which, when executed on one or more machines, cause the one or more machines to perform operations comprising:

detecting an indication to begin a coordinated media show, wherein the coordinated media show is associated with a wagering game being presented in a wagering game system;

selecting a primary playlist and accompanying playlists associated with the coordinated media show;

transmitting, over a network, the accompanying playlists to components in the wagering game system;

executing a first program code that processes a first media content and presents a first media effect in the wagering game system, wherein the first program code is associated with the primary playlist;

detecting a synchronization trigger in the first media content;

transmitting, over the network, a synchronization marker to the components of the wagering game system; and executing, in response to receipt of the synchronization marker, a second program code that processes a second media content and presents a second media effect in the wagering game system, wherein the second program code is associated with the primary playlist.

2. The one or more non-transitory machine-readable storage media including instructions of claim 1, wherein the network is a multi-drop network.

3. The one or more non-transitory machine-readable storage media including instructions of claim 1, wherein the media content includes audio content, and the detecting the synchronization trigger includes monitoring the audio content for changes in one or more of volume, pitch, tone, and tempo.

4. The one or more non-transitory machine-readable storage media including instructions of claim 1, wherein the components include a plurality of emotive lighting controllers.

5. The one or more non-transitory machine-readable storage media including instructions of claim 1, wherein the media content includes one or more of audio content, video content, and content for lighting effects.

6. A system comprising:
a wagering game server configured to
  determine results for wagering games,
  detect events associated with the wagering games,
  select media shows associated with the events, wherein the media shows include audio content and video content, and
  initiate presentation of the media show;
a plurality of emotive lighting controllers configured to
  detect initiation of the media shows;
  detect synchronization triggers in the audio content and the video content,
  transmit, to one or more of the plurality of emotive lighting controllers over a multi-drop network, synchronization markers that indicate transitions between lighting effects in the media show, and
  execute a first group of one or more scripts to produce media effects for the media shows;
  receive one or more of the synchronization markers;
  execute a second group of one or more scripts to produce different media effects in response to receipt of the synchronization markers; and
media devices configured to present the media effects.

7. The system of claim 6, wherein the media devices include lighting devices, and wherein the media effects include lighting effects.

8. The system of claim 6 further including:
wagering game machines configured to present the wagering games, and wherein one or more of the media devices are mounted on the wagering game machine.

9. The system of claim 6, wherein the media devices include one or more of light emitting diode arrays, light bars, spot lights, slot reel illuminators, and overhead sign lights.

10. The system of claim 6, wherein the synchronization markers include ASCII text.

11. A method for synchronizing lighting effects and audio effects among wagering game machines arranged in a bank, the method comprising:
presenting a wagering game on a wagering game machine in the bank;
detecting an event in the wagering game for which to present the lighting effects and the audio effects;
selecting playlists that define the lighting effects and the audio effects;
notifying lighting controllers in the bank about the playlists;
presenting a first group of the lighting effects and a first group of the audio effects via lighting and audio devices mounted on the wagering game machine in the bank;
detecting a synchronization trigger associated with the audio effects; and
transmitting, to the lighting controllers in the bank, a synchronization marker that prompts the lighting controllers to present a second group of the lighting effects.

12. The method of claim 11, wherein the detecting the synchronization trigger includes monitoring the first group of the audio effects for an end of a sound effect.

13. The method of claim 11, wherein the lighting controllers are configured to facilitate presentation of the audio effects and the lighting effects.

14. The method of claim 11, wherein the transmitting of the synchronization marker occurs over an a multi-drop network that substantially simultaneously delivers the synchronization marker to the lighting controllers in the bank.

15. The method of claim 11, wherein the presenting a first group of the lighting effects and a first group of the audio effects via lighting and audio devices mounted on the wagering game machine in the bank further comprises:
executing scripts identified in one of the playlist, wherein the scripts include instructions for controlling the lighting devices and audio devices.

16. An apparatus configured to synchronize lighting effects and audio effects among wagering game machines arranged in a bank, the apparatus comprising:
one or more processors;
a machine-readable memory configured to store program code executable on at least one of the one or more processors, the program code including,
program code for presenting a wagering game on a wagering game machine in the bank;
program code for detecting an event in the wagering game for which to present the lighting effects and the audio effects;
program code for selecting playlists that define the lighting effects and the audio effects;
program code for notifying lighting controllers in the bank about the playlists;
program code for presenting a first group of the lighting effects and a first group of the audio effects via lighting and audio devices mounted the wagering game machine in the bank;
program code for detecting a synchronization trigger associated with the audio effects; and program code for transmitting, to the lighting controllers in the bank, a synchronization marker that prompts the lighting controllers to present a second group of the lighting effects.

17. The apparatus of claim 16, wherein the program code for detecting the synchronization trigger includes program code for monitoring the first group of the audio effects for an end of a sound effect.

18. The apparatus of claim 16, wherein the lighting controllers are configured to facilitate presentation of the audio effects and the lighting effects.

19. The apparatus of claim 16, wherein transmission of the synchronization marker occurs over an multi-drop network that substantially simultaneously delivers the synchronization marker to the lighting controllers in the bank.

20. The apparatus of claim 16, wherein the program code for the presenting a first group of the lighting effects and a first group of the audio effects via lighting and audio devices mounted the wagering game machine in the bank further comprises:

program code for executing scripts identified in one of the playlist, wherein the scripts include instructions for controlling the lighting devices and audio devices.

* * * * *